3,168,477
DELACQUERING PROCESS
Leonard E. Swanson, Plainfield, and Harold P. Wilson, Metuchen, N.J., assignors to Vulcan Materials Company, Sewaren, N.J., a corporation of New Jersey
No Drawing. Filed July 17, 1961, Ser. No. 124,384
12 Claims. (Cl. 252—95)

This invention relates to a process for removing certain corrosion resistant organic coatings from surfaces to which they have been applied. This invention more particularly relates to removing coatings such as baked on synthetic resin coatings, from tin plate scrap either before or during the removal of the tin by the alkaline detinning process.

The alkaline process for recovering tin from tin plate scrap by treating the scrap with an alkaline solution containing an oxidizing agent is old and well known. Alkali metal hydroxides and particularly sodium hydroxide are used in aqueous solution in amounts of 20–200 grams per liter. To this is added an oxidizing agent such as sodium nitrate, sodium nitrite, sodium or potassium permanganate and other inorganic oxidizing agents including chlorates and perchlorates. As a practical matter, a mixture of sodium nitrate and sodium nitrite is frequently used because it is a cheap, readily available material. The operation of this process to recover baled steel scrap, low in tin, for shipment to steel mills and tin as metal or tin chemicals is well known to those familiar with the art.

Over the past two or three decades, the use of coating materials on tin plate has come into more frequent use. Some of these are used as insulating materials, for example, on wire, but for the most part synthetic resinous coatings are applied to tin plate to protect the interior of containers from the corrosive action of the contents. Some types of the coating materials are fairly readily removed during the course of heating the tin plate scrap in the alkaline solution. The effect of the hot caustic rather rapidly breaks down the coating and permits contact of the chemicals with the tin.

In more recent years, synthetic resinous coatings, which are usually baked on, have been employed because they offer greater resistance to corrosion. This very property which makes the coating material desirable for protection against corrosion, enhances the problem of penetrating or removing it from tin plate scrap sufficiently to permit the detinning chemicals to act upon and dissolve the tin metal. Being more resistant to corrosion generally, the coatings naturally may be expected to be more resistant to the effect of the detinning chemicals. While the solution will eventually penetrate, longer periods of time are required to effect detinning. This means a reduction in plant capacity and a consequent increase in cost.

Many coatings can be removed sufficiently to permit the detinning chemicals to act if sufficient time is allowed. For example, some tin plate scrap coated with vinyl and epoxy type resins may require twenty-four hours or more to complete the detinning operation. The tin itself could be removed within less than four hours if the coating were not present.

Coatings especially difficult to remove are the vinyl and epoxy base resins (frequently used as corrosion resistant coatings in the chemical industry), chlorinated rubber base coatings, alkyd coatings, etc.

Removal of the coatings by means of comparatively expensive organic solvents which tend to dissolve or otherwise destroy the coating as a preliminary to detinning in a subsequent step is generally not practical. The problems associated with recovering the chemicals from the large bulk of the scrap are either time consuming or require such elaborate equipment as to run cost up to a prohibitive figure.

It is therefore, desirable to carry out the removal of these resistant coatings in an alkaline solution which will remove or lift the coating material in a reasonably short time thus permitting removal of the tin from the base metal. It is with this type of operation that the present invention is concerned. Since the delacquering solution used in the present invention is strongly alkaline and may be conveniently composed of some of the same components as are used in the detinning operation, it is feasible to delacquer the tin plate before the detinning step. Any chemicals remaining on the scrap are not lost, but become an active and beneficial part of the detinning bath. It is not even necessary to rinse the delacquered scrap unless for some reason this is advantageous, before transferring the scrap to the detinning steps. This permits greater flexibility in processing, and also reduces the amount of organic sludge in the detinning tanks.

In a broad embodiment the invention comprises a process for removing synthetic organic coatings from tin plate and the like, which includes the steps of immersing or otherwise contacting the coated material with a hot aqueous solution of an alkali metal hydroxide, a minor proportion of a condensed ring aromatic hydrocarbon preferably having two fused rings, and a minor amount of a surface active agent possessing wetting and emulsifying properties.

In a further embodiment an oxidizing agent is added to the alkaline solution and coated tin plate is simultaneously stripped of coating and is detinned.

The alkali metal hydroxide may be any of the alkali metal group such as sodium, potassium, lithium, etc. Because of the cost involved, sodium hydroxide is preferred. The concentration of caustic in the aqueous solution is in the range of 20 to 200 grams per liter. The solution can be used to remove the resistant synthetic coating either with or without an oxidizing agent being present. This makes it possible to carry out the removal of the synthetic coatings and the tin in the same solution and in a reasonably short time. For reasons of economy of operation this is the preferred method but it is also practical to remove the synthetic coatings in a separate solution prior to detinning. Suitable oxidizing agents are sodium nitrate-nitrite mixtures, sodium plumbate, sodium chlorate, sodium perchlorate, sodium permanganate, or other known oxidizing agents suitable for use in an alkaline environment. Corresponding potassium or other alkali metal compounds may be employed.

The condensed ring aromatic hydrocarbons may vary considerably from pure compounds to mixtures of compounds. Naphthalene and its mono- and poly-alkyl (particularly lower alkyl) substituted derivatives such as methyl naphthalenes, dimethyl naphthalenes, ethyl naphthalenes, propylnaphthalenes, etc., are particularly effective. Essentially aromatic hydrocarbon fractions boiling in the range of about 170° to about 350° C. and higher, and derived from coal tar distillates, or from certain petroleum fractions which are high in aromatic hydrocarbon content are suitable. Fractions of which naphthalene and alkyl substituted naphthalenes are a major constituent and which boil between 170° C. and 250° C. are especially effective. Fractions of highly cracked petroleum oils such as catalytically cracked cycle oils, synthetic tower bottoms and the like may be employed. These may range in aromatic content from about 30 to 70 percent or more. The higher the aromatic content the better as a general rule. Such fractions are frequently found as by-products from petroleum hydrocarbon catalytic cracking processes. Other useful fractions comprise high boiling (170° C.–350° C.) products from the catalytic reforming of petroleum naphthas and which are highly aromatic.

Extracts of highly aromatic oils, particularly those containing fused ring aromatic hydrocarbons may be employed to advantage. They are usually viscous at atmospheric temperature conditions but should be fluid at least at the temperature of the delacquering operation which takes place from about 90° to 100° C. or thereabouts. The solvent extracts from lubricating oil refining may be used. These and other aromatic extracts may be obtained by extraction of petroleum fractions with solvents selective for aromatic hydrocarbons, such as sulfur dioxide, furfural, phenol, nitrobenzene, etc. They may also be obtained by processes of extractive distillation which are well known in the petroleum and other industries.

The aromatic fractions should contain substantial proportions of fused ring aromatic hydrocarbons and their lower alkyl derivatives. The alkyl substituent groups may be saturated or unsaturated. The substituent groups in aromatic catalytic cycle oils usually have short chains, say $C_1$ to $C_4$. Such oils may contain alkyl benzenes which have indifferent delacquering power, but have the effect of dissolving the effective fused ring compounds which are either normally solid or highly viscous. Such solutions may be easier to emulsify than the solid or viscous components. Such oils may be enriched by adding fused ring components such as naphthalene, methyl naphthalene, etc., or more highly concentrated fractions such as crude naphthalene and/or methyl naphthalene fractions of coal tar oil, drip oils, etc.

The surface active agent may vary considerably. Because of its cost, tall oil, and tall oil fatty acids are preferred. Tall oil is a by-product of the kraft and sulfite pulping of conifers in the production of kraft paper, newsprint, etc. It is typically made up of high molecular weight fatty acids 20–60%; resin acids 10–60% and unsaponifiable material 5–25%. The fatty acids are largely unsaturated acids having about 18 carbon atoms and include oleic, linoleic, conjugated linoleic, linolinic, etc. Unsaturated acids and hydroxy acids from other sources may be employed, e.g. acids derived by saponification of vegetable oils such as linseed oil, castor oil, soya bean oil, cotton seed oil, etc. Cost, however, is a factor favoring the tall oil acids.

The agent may be added to the delacquering solution in the form of the free acid or as the alkali metal salts. Ordinarily the surface active agents are added in amounts of usually less than about two grams, and preferably about 0.25 to about 0.5 gram per liter of delacquering solution. They should not be decomposed by the hot caustic during the delacquering operation, and should have a high enough boiling point so as not to distill off at delacquering and detinning temperatures. They appear to be of benefit because they assist in wetting the coated scrap and also tend to keep the insoluble aromatic hydrocarbon in suspension during the operation. The exact function of the hydrocarbon and of the wetting agent is not entirely understood. Suffice to say that in the proportons mentioned, the rate of delacquering of the coated scrap is increased by a factor of about five to ten times. Furthermore, the agents are more effective when used together than when only one of them is used. In fact, the wetting agent such as tall oil appears to have little or no effect on the rate of delacquering when it is used alone without the aromatic hydrocarbon being present.

Instead of tall oil, it is possible to use other wetting agents including petroleum sulfonic acids (also known as mahogany acids), petroleum tar acids, petroleum naphthenic acids, and the like or their alkali metal salts. Also alkyl aryl sulfonates, beta naphthalene sulfonates may be used. These appear in the detinning solution as their alkali metal (usually sodium) salts. Alkanol amines or their derivatives may also be used. There are many proprietary wetting and dispersing agents which can be employed but in general these are not preferred because of the higher cost involved. Cheaper materials such as tall oil or the petroleum mahogany acids are preferred.

Alkali metal soaps of fatty acids of 12–22 carbon atoms, either saturated or unsaturated may be used.

The following examples are presented to illustrate the process but should not be construed as limiting it to the exact steps shown.

*Example I*

A detinning solution was made up to contain 50 grams per liter (g.p.l.) of caustic soda and 6 g.p.l. of sodium nitrate. Approximately 0.5 g.p.l. of tall oil heads was added to the hot (95° C.) agitated solution. When the tall oil heads became saponified by the alkaline solution, 4.0 g.p.l. of naphthalene was added to the agitated solution. The naphthalene soon melted and dispersed to form an emulsion. Thereafter, only mild agitation was required to maintain the emulsion. Tin plate scrap coated with resistant enamel was then detinned in the hot solution. The addition of the naphthalene and tall oil heads improved the detinning rate 5 to 9 times the normal rate for similar coated scrap and solution from which the tall oil and naphthalene were omitted.

*Example II*

A detinning solution was prepared to contain 50 g.p.l. of caustic soda and 6 g.p.l. of sodium nitrite. Approximately 0.5 g.p.l. of tall oil heads was added to the hot (95° C.) agitated solution. When the tall oil heads became saponified by the alkaline solution, 4.0 g.p.l. of methyl naphthalene was added to the agitated solution. The liquid methyl naphthalene soon dispersed into the solution to form an emulsion. Thereafter, only mild agitation was required to maintain the emulsion. The addition of the methyl naphthalene and tall oil heads improved the detinning rate of coated scrap tin in the same range as when naphthalene and tall oil heads were used.

*Example III*

A high boiling aromatic naphtha fraction, from petroleum cracking, containing 40–50% of various alkyl naphthalenes along with 40–50% alkyl benzenes and up to 10% naphthenes was used instead of naphthalene or methyl naphthalene as in the foregoing examples. The aromatic naphtha fraction had a boiling range of 205°–390° C.

The improvement in rate of detinning the coated scrap was similar to that obtained in the preceding examples.

*Example IV*

A solution was made up to contain 50 grams per liter of caustic soda. Approximately 0.5 grams per liter of tall oil heads was added to the hot (95° C.) agitated solution. When the tall oil heads became saponified by the caustic soda solution, 4.0 grams per liter of naphthalene was added to the agitated solution. The naphthalene soon melted and dispersed to form an emulsion. Tin plate scrap coated with resistant lacquer was treated in the solution for one (1) hour at about 95° C. after which the scrap was removed from the solution, allowed to drain, and was detinned by immersing in a second solution containing 50 grams per liter of caustic soda and 6 grams per liter of sodium nitrate, the solution being heated to 95° C. Detinning was as rapid as with tin plate scrap not cotaed with resistant lacquer.

The aromatic fractions which may be from petroleum sources or may be coal tar heavy naphthas and the like contain considerable amounts of alkyl benzenes which are not particularly effective as delacquering agents. As indicated above, the addition of 5 to 20% by weight of naphthalene or methyl naphthalene or fractions which are rich in these compounds increases the effectiveness so that the mixture is of about equivalent delacquering power as pure naphthalene.

Aromatic fractions which may be characterized as heavy naphthas or light gas oils and derived from sources previously discussed may be improved in effectiveness both as to delacquering power and as to their dispersibility by thermal treatment and preferably by catalytic treatment at elevated temperatures. While the reason for this is not entirely understood, it is thought that the treatment promotes condensation of alkyl benzenes present to form fused ring compounds or more highly condensed aromatic compounds which have characteristics similar to those of the alkyl naphthalenes, at least insofar as delacquering effectiveness is concerned.

As will be brought out more fully below, similar improvement can be obtained by combining tall oil fatty acids in small proportions with the aromatic naphtha or gas oil fractions and subjecting them to treatment with catalysts at elevated temperatures.

One method involves treating the aromatic fraction itself at a temperature of about 150° C. to about 200° C., for a period of about one hour or more in the presence of catalysts such as Friedel-Crafts catalysts or other catalysts having condensation or polymerization properties. Anhydrous aluminum chloride, stannous chloride, antimony tetrachloride, boron trifluoride or its complexes with ether, phenols or lower molecular weight organic acids such as acetic or propionic acids, are illustrative. Sulfamic acid or magnesium sulfate, as well as mineral acids, such as sulfuric acid or phosphoric acid, may be used. Finely divided metal oxides such as red iron oxide, alumina, etc. either as such or as a coating on metal particles may be used in the thermal treatments described herein, either alone or in conjunction with other catalysts. Concentrated sulfuric acid is effective in proportions of about 1% by weight, as is fuming sulfuric acid containing about 10 to 20% free $SO_3$, although these catalysts tend to form tars. The addition of finely divided metallic aluminum is helpful, in that it tends to improve the product and reduce or retard the formation of tars, particularly when using Friedel-Crafts type catalysts. The presence of a small amount of aluminum powder or of anhydrous aluminum sulfate also tends to reduce tar formation and permit lower proportions of acid when sulfuric acid is used as the catalyst.

The catalysts are usually employed in quantities of 5% or less and preferably about 2% or less by weight of the aromatic fraction being treated.

The aromatic fraction may be mixed with about 5 to about 30% and preferably about 5 to 10% by weight of tall oil fatty acids and heated for a period of at least one hour at a temperature of about 100° C. to 200° C. and preferably about 180° C. Higher temperatures may be used but the temperatures should be below that at which decomposition of the fraction and/or the tall oil fatty acids begins to occur. At the higher temperatures, the heating may be carried out in pressure vessels or under reflux, to prevent loss through distillation. Unless otherwise indicated, the heating tests which are being described, were carried out at about atmospheric pressure. The use of pressure or refluxing or both would, of course, be necessary to maintain the mixture in liquid phase in the event that a temperature above the initial boiling point of the fraction were to be used.

The heat treatment may be carried out in batches in a closed bomb or other pressure vessel, or may be carried out continuously by pumping the reaction mixture through a heated pipe or tube. The discussion of the manner of heat treatment refers to all of the heat treating procedures discussed herein.

Apparently, during the simple heat treatment of the mixture of the aromatic fraction and the tall oil fatty acids results in isomerization or some other type of reaction since the product is much more readily dispersed in hot alkaline solutions than are simple mixtures of the fraction and the tall oil fatty acids. The delacquering power which the mixture possesses after heat treatment, or heat treatment with catalysts, is about the same or may even exceed that of naphthalene, being substantially improved over what it was before such treatment. Because of the relatively low cost of the fractions, their availability, and the substantial improvement in effectiveness, the pretreatment can be justified.

A similar mixture of the aromatic fraction and tall oil fatty acids may be heat treated with anhydrous aluminum chloride for one to five hours at a temperature in a range of about 120° to 140° C. Small proportions of aluminum powder may also be added with beneficial effects. The resulting heat treated material may be added to alkaline delacquering or detinning solution and is found to be as effective as naphthalene in its delacquering power. Instead of aluminum chloride, other catalysts, such as those mentioned above, may be employed. In this event, temperatures as high as 180° C. or even higher may be employed. Here again, the temperature and time should be below that at which substantial decomposition and/or excessive tar formation occurs.

The aromatic fraction in admixture with about 5 to about 30% by weight of tall oil fatty acids may be heat treated with concentrated sulfuric acid or fuming acid (10 to 20% free $SO_3$) in amounts equal to about 20–30% of acid by weight of the tall oil fatty acids used. In this procedure, the temperature is first raised to about 120° C. and may be held at this point for approximately 15 minutes. The temperature may then be raised to about 140° C. for an additional one hour treatment. The product is readily saponified by addition of a small amount of sodium hydroxide and possesses superior dispersibility in hot alkaline or detinning solutions. It is as effective as naphthalene in its delacquering power.

According to another procedure the tall oil fatty acids or other fatty acids may first be mixed with 20–30% by weight of fuming sulfuric acid (10 to 20% free $SO_3$), the temperature being raised to a maximum of about 120°–125° C. where it is held for approximately 0.5 hour. The sulfonation product without separation of the catalyst, may then be admixed with the aromatic fraction or with an alkyl naphthalene, such as methyl naphthalene or fractions containing alkyl naphthalenes, in proportions of about 5 to 30% of the acid treated fatty acids and the mixtures may be heated at a temperature of about 120°–140° C. for about one hour to produce an effective, readily dispersible mixture.

In either of the foregoing procedures the presence of a small amount of aluminum powder or anhydrous aluminum sulfate, or of metal oxides such as described above, is beneficial in that they reduce the ratios of the fatty acids and sulfuric acid to the aromatic solvent necessary for best results. For example, as little as 5% of tall oil fatty acids and 1% of sulfuric acid based on the aromatic compound or aromatic fraction may be used effectively when about 1% of aluminum powder is added.

The proportions of sulfuric acid required to catalyze the reactions may be decreased by an addition of 5 to 25% of furfural by weight of the aromatic fraction. Apparently, furfural links the aromatic naphtha and the olefinic acids of the tall oil fatty acids to form complexes which are semi-soluble and readily dispersible in hot alkaline solutions. Other aldehydes, and ketones, for example, di-isobutyl ketone may be used instead of furfural, either by themselves or in admixture.

Thus, the mixture of an aromatic fraction with 5 to 10% of tall oil fatty acids is agitated with about 1% of fuming sulfuric acid. Furfural in the amount of 10% by weight of the naphtha is added and the resultant mixture is heated to about 120°–125° C. for sixty minutes or more. This mixture may be saponified with sodium hydroxide or other alkali to form a concentrate which may be employed effectively for delacquering or simultaneous delacquering and detinning. Some dark colored resin is formed during the reaction and this is largely dissolved and readily dispersed during saponification.

Similar treatments of mixed aromatic fractions and tall oil fatty acids may be heated with 2% to 4% or more of compatible organic acids, such as glacial acetic acid, naphthenic acids, and the like, at a temperature of 100°–120° C. initially. The purpose of the moderate heating temperature is to minimize loss of acid. The use of a closed vessel and superatmospheric pressure may accomplish the same effect and permit the use of higher temperatures. The mixtures should be heated for at least one hour. The product, when saponified with sodium hydroxide or the like is readily dispersible in hot alkaline solutions and has delacquering power similar to that of naphthalene. Here again, the presence of the small amount of aluminum metal powder, say 1% or less, by weight of the mixture is of benefit. Instead of tall oil acids, unsaturated fatty acids from other sources may be used in the above described methods for improving the aromatic fractions.

In all instances, discussed above, the heat treated material may be added directly to the alkaline delacquering or detinning solutions or they may be saponified with sodium hydroxide or other metal hydroxide or carbonate and made into the form of a stable emulsion concentrate which can then be added to the delacquering or detinning solutions. Generally it is not necessary to separate residual catalysts, although in some instances it may be desirable to filter out solid catalysts after heat treatment and before adding the treated material to the alkaline solutions.

The foregoing examples are illustrative and should not be construed as limiting the invention to the exact embodiments described.

We claim as our invention:

1. A process for alkaline delacquering of tin plate having a resinous lacquer coating applied to the surface thereof which comprises applying to said coated surface a hot aqueous solution consisting essentially of about 20 to 200 grams per liter of an alkali metal hydroxide dissolved in water, a minor active amount of a hydrocarbon selected from the group consisting of naphthalene and $C_1$ to $C_4$ alkyl substituted naphthalenes, and about 0.25 to less than 2 grams per liter of a surface active agent which has wetting and emulsifying properties, which is not decomposed by the hot alkali metal hydroxide solution and which has a boiling point high enough so as not to distill off in the delacquering process.

2. The process of claim 1 wherein said naphthalene hydrocarbon is present as a substantially aromatic fraction boiling above about 170° C. which has been subjected to heat treatment at a temperature above about 100° C. for a period of at least one hour in the presence of a condensation catalyst selected from the group consisting of Friedel-Crafts catalysts, sulfuric acid, phosphoric acid, sulfamic acid and magnesium sulfate.

3. A process for alkaline delacquering of tin plate having a resinous lacquer coating applied to the surface thereof which comprises applying to said coated surface a hot aqueous solution consisting essentially of about 20 to 200 grams per liter of an alkali metal hydroxide dissolved in water, about 0.25 to less than 2 grams per liter of an alkali metal soap of a fatty acid of about 12 to 22 carbon atoms, and a minor active amount of a hydrocarbon selected from the group consisting of naphthalene and $C_1$ to $C_4$ alkyl substituted naphthalenes.

4. A process according to claim 3 wherein the fatty acid salt is an alkali metal salt of tall oil fatty acids.

5. A process according to claim 3 wherein the resinous lacquer coating comprises a vinyl resin.

6. A process according to claim 3 wherein said hydrocarbon is present as an essentially aromatic naphtha fraction boiling in the range of about 170° to about 350° C.

7. A process according to claim 3 wherein said hydrocarbon is present as a catalytically cracked cycle oil.

8. A process for accelerating the delacquering during detinning of tin plate having a resinous lacquer coating applied to the surface thereof which comprises immersing said coated tin plate in a hot aqueous detinning solution consisting essentially of about 20 to 200 grams per liter of an alkali metal hydroxide dissolved in water, an oxidizing amount of an inorganic oxidizing agent selected from the group consisting of sodium nitrate, sodium nitrite, sodium nitrate-nitrite mixtures, sodium plumbate, sodium chlorate, sodium perchlorate and sodium permanganate, about 0.25 to less than 2 grams per liter of an alkali metal soap of a fatty acid of about 12 to 22 carbon atoms, and a minor active amount of a naphthalene hydrocarbon selected from the group consisting of naphthalene and $C_1$ to $C_4$ alkyl substituted naphthalenes.

9. A process according to claim 8 wherein the soap is an alkali metal salt of tall oil fatty acids.

10. A process according to claim 8 wherein said detinning solution comprises about 6 grams per liter of sodium nitrate as the oxidizing agent.

11. A process according to claim 10 wherein the detinning solution comprises about 4 grams per liter of naphthalene.

12. A process according to claim 10 wherein said naphthalene hydrocarbon is added to the solution in the form of a catalytically cracked aromatic naphtha fraction boiling above about 150° C.

References Cited in the file of this patent

UNITED STATES PATENTS

| | | |
|---|---|---|
| 2,010,800 | Adams et al. | Aug. 13, 1935 |
| 2,180,814 | Maltox et al. | Nov. 21, 1939 |
| 2,272,266 | Grosse et al. | Feb. 10, 1942 |
| 2,673,143 | Fresne et al. | Mar. 23, 1954 |
| 2,738,293 | Spence | Mar. 13, 1956 |
| 2,827,439 | Helper et al. | Mar. 18, 1958 |
| 2,889,381 | Scott | June 2, 1959 |
| 2,891,881 | Jaffe | June 23, 1959 |
| 3,060,126 | Gerard et al. | Oct. 23, 1962 |

OTHER REFERENCES

"Uses of Tallol Soaps," Soap, April 1940, page 61.

"Tall Oil," Ind. and Eng. Chem., vol. 52, No. 9, pages 726–32. September 1960.